United States Patent [19]

Gruber et al.

[11] Patent Number: 5,561,246

[45] Date of Patent: Oct. 1, 1996

[54] BIAXIAL RATE GYRO COMPRISING ELASTIC JOINT PARTS

[75] Inventors: Ernest Gruber, Munich; Hendrik Becker, Otterfing, both of Germany

[73] Assignee: Deutsche Aerospace AG Patente, Munich, Germany

[21] Appl. No.: 339,226

[22] Filed: Nov. 10, 1994

[30] Foreign Application Priority Data

Nov. 10, 1993 [DE] Germany ............ 43 38 279.7

[51] Int. Cl.[6] .................. G01C 19/28; G01C 19/22
[52] U.S. Cl. ........................ 73/504.11; 74/5.6 D
[58] Field of Search .................. 73/504, 505, 517 R; 74/5.6 D, 5.6 A, 5 F, 5.6 R, 5.6 E

[56] References Cited

U.S. PATENT DOCUMENTS

| | | | |
|---|---|---|---|
| 4,061,043 | 12/1977 | Stiles | 74/5.6 D |
| 4,095,477 | 6/1978 | Morris et al. | 74/5.6 D |
| 4,217,787 | 8/1980 | Liebing et al. | 74/5.6 D |
| 4,386,535 | 6/1983 | Albert | 73/504 |
| 4,848,169 | 7/1989 | Duncan et al. | 74/5 F |
| 5,156,056 | 10/1992 | Pittman et al. | 74/5.6 D |

FOREIGN PATENT DOCUMENTS

3619941A1  12/1986  Germany .

Primary Examiner—Hezron E. Williams
Assistant Examiner—Helen C. Kwok
Attorney, Agent, or Firm—Evenson McKeown Edwards & Lenahan, P.L.L.C.

[57] ABSTRACT

A two-axis rate gyro has two articulation elements arranged sequentially. The first articulation element is connected with a drive shaft of the rate gyro and the second articulation element is connected with a gyro rotor. The two articulation elements are connected together by two narrow ribs located laterally with respect to a central bore and perpendicularly or radially with respect to the central axis of the articulation elements. Spring elements are provided in one of the articulation elements which act on pretensioned force-measuring elements and are tensioned with respect to one another. The spring elements deform elastically and symmetrically around the ribs under the influence of a sinusoidally alternating torque, so that the force-measuring elements are loaded and unloaded alternately and generate measurement signals proportional to the forces acting on them.

22 Claims, 3 Drawing Sheets

BIAXIAL RATE GYRO COMPRISING ELASTIC JOINT PARTS

BACKGROUND AND SUMMARY OF THE INVENTION

The invention relates to a two-axis rate gyro with elastic articulation elements.

An angular velocity sensor for navigation purposes with a rotating gyro element is known from German Patent Document DE 36 19 941 A1, said element being secured mechanically by means of a piezoelectric crystal acting leverwise. When an angular velocity occurs around an axis perpendicular to the operating axis of the device, the piezoelectric crystal is bent leverwise, delivering an electrical signal. In this gyro, the piezoelectric crystal is long relative to its restraint so that relatively large measuring deflections occur under stress caused by angular velocity. Thus, the gyro does not have very rigid restraint, shows considerable nonlinearity of the measurement deflection, and has a relatively large coupling error that depends on the measuring deflection.

An object of the invention is to provide elastic articulation elements for a two-axis rate gyro that ensure a very rigid restraint of the gyro and hence minimal linear measuring deflections.

This object is achieved according to preferred embodiments of the invention by providing a two-axis rate gyro comprising: a drive shaft, a gyro rotor, first and second articulation elements arranged axially and sequentially, the first articulation element being connected with the drive shaft and the second articulation element being connected with the gyro rotor, the two articulation elements being connected together by two narrow ribs located laterally with respect to a central bore and perpendicularly with respect to a central axis of the articulation elements, and spring elements acting on pretensioned force-measuring elements and being tensioned with respect to one another, the spring elements deforming elastically and symmetrically around the ribs under the influence of a sinusoidally alternating torque during operation of the gyro with the force-measuring elements being loaded and unloaded alternately and generating measurement signals proportional to the forces acting on them.

An important advantage of the articulation elements with quasi-rigid spring elements according to the invention consists in the resultant rigid restraint of the gyro. Consequently, only very small measuring deflections occur, with minimal deviation from linearity and negligible coupling errors over the entire measurement range. All of these properties produce high dynamics for the gyro, i.e. the ratio of the measurement range to the resolution or response sensitivity. A dynamic of 1/10,000 or more is reached, corresponding for example to a measurement range from 1,000°/sec to 0.01°/sec resolution. In particular, preferred embodiments with the spring elements designed as expansion bolts have the advantage of a simple, compact design utilizing conventional commercial spring and force elements.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
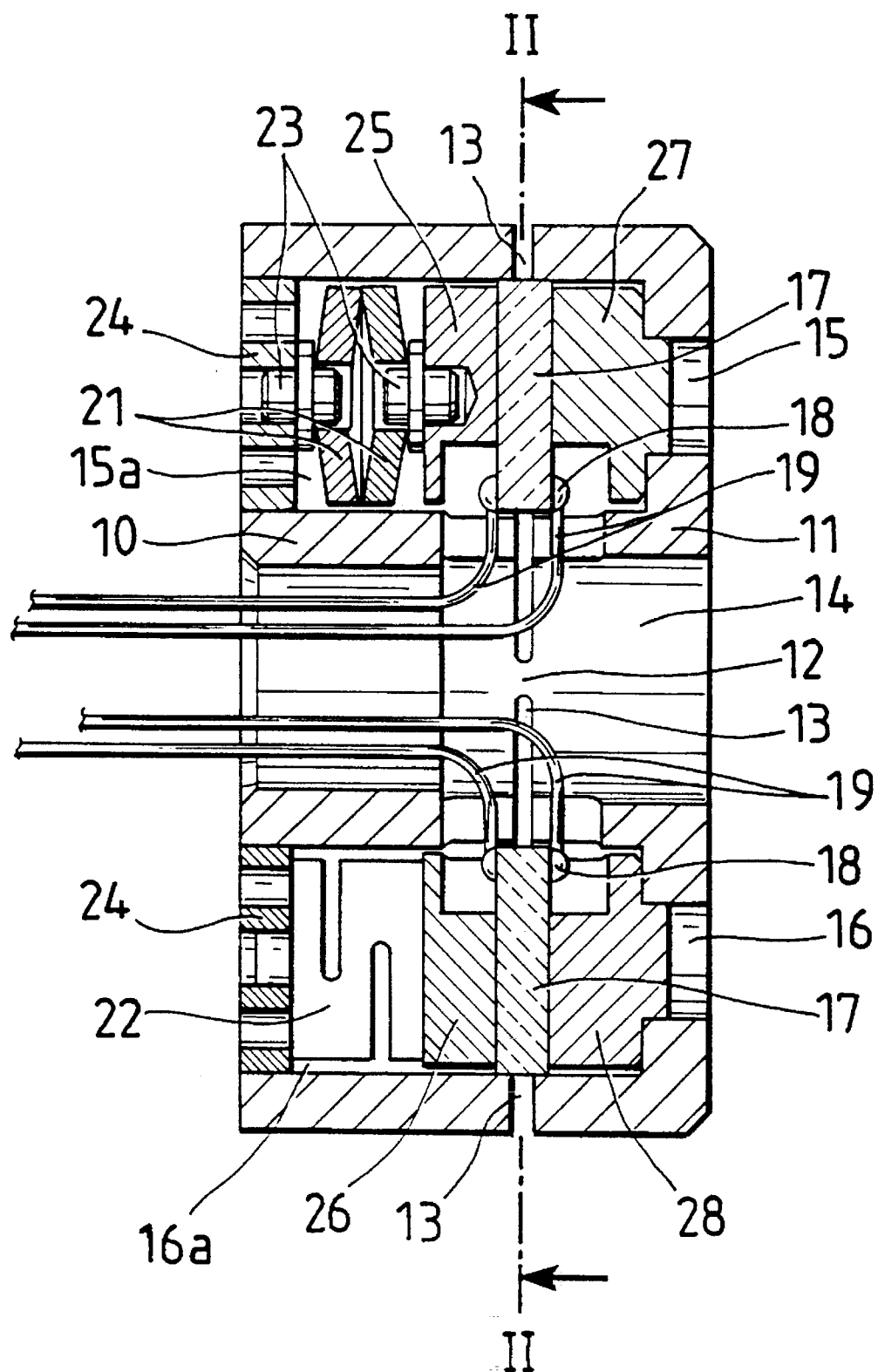
FIG. 1 is a sectional view of elastic articulation elements for a gyro in which force-measuring elements and two embodiments of spring elements according to the invention are incorporated.
Figure 2:
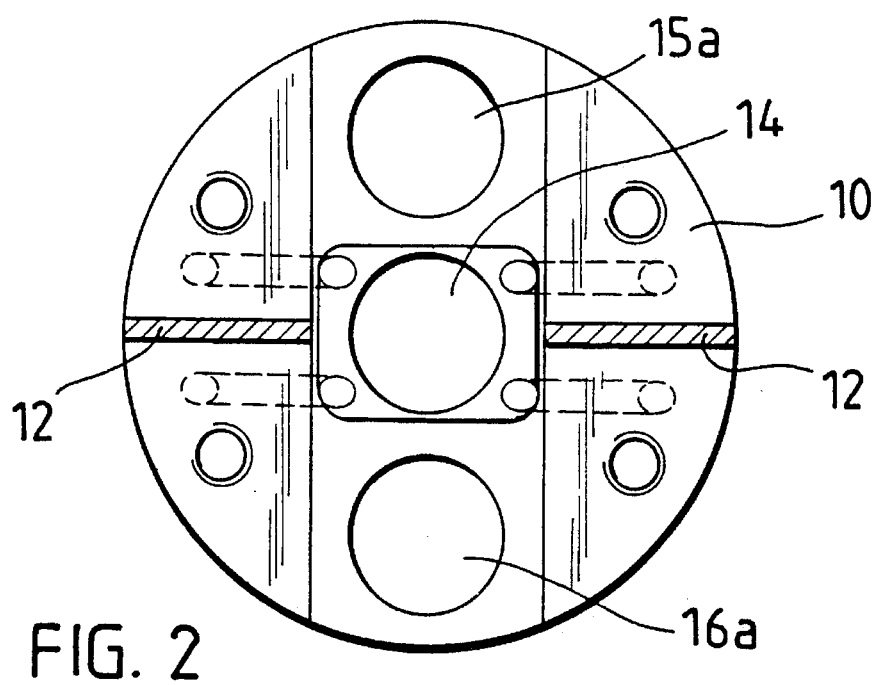
FIG. 2 is a sectional view showing the elements according to FIG. 1, taken along the line II—II, and with the force-measuring elements and spring elements omitted.

FIG. 1 shows two round cylindrical articulation elements 10 and 11, separated from one another by slit 13 as well as a rib 12 (see also FIG. 2). A central bore 14 passes through both articulation elements 10 and 11 through which bore a drive shaft, not shown here, for a rate gyro passes. Additional through bores 15 and 16 are provided above and below in which quartzes 17 are inserted into slit 13 and laterally thereof as force-measuring elements. Electrical leads 19 are connected to quartzes 17 with soldered spots 18, through which the measuring signals generated in quartzes 17 are conducted. In FIG. 1, two embodiments of spring elements are shown in first articulation element 10. A cup spring 21 is visible at the top in bore 15a and a special compression spring 22 is shown at the bottom in bore 16a. Cup spring 21 is centered by centering pin 23. Both springs 21 and 22 are pressed by adjusting washers 24 against pressure elements 25 and 26, which in turn transmit the forces of spring 21 and 22 to quartzes 17 which in turn abut second articulation element 1 through pressure elements 27 and 28. In FIG. 2, the quartzes and the springs have been omitted and hence essentially only the first articulation element 10, rib 12, and bores 14, 15a, and 16a are visible.

Figure 3:
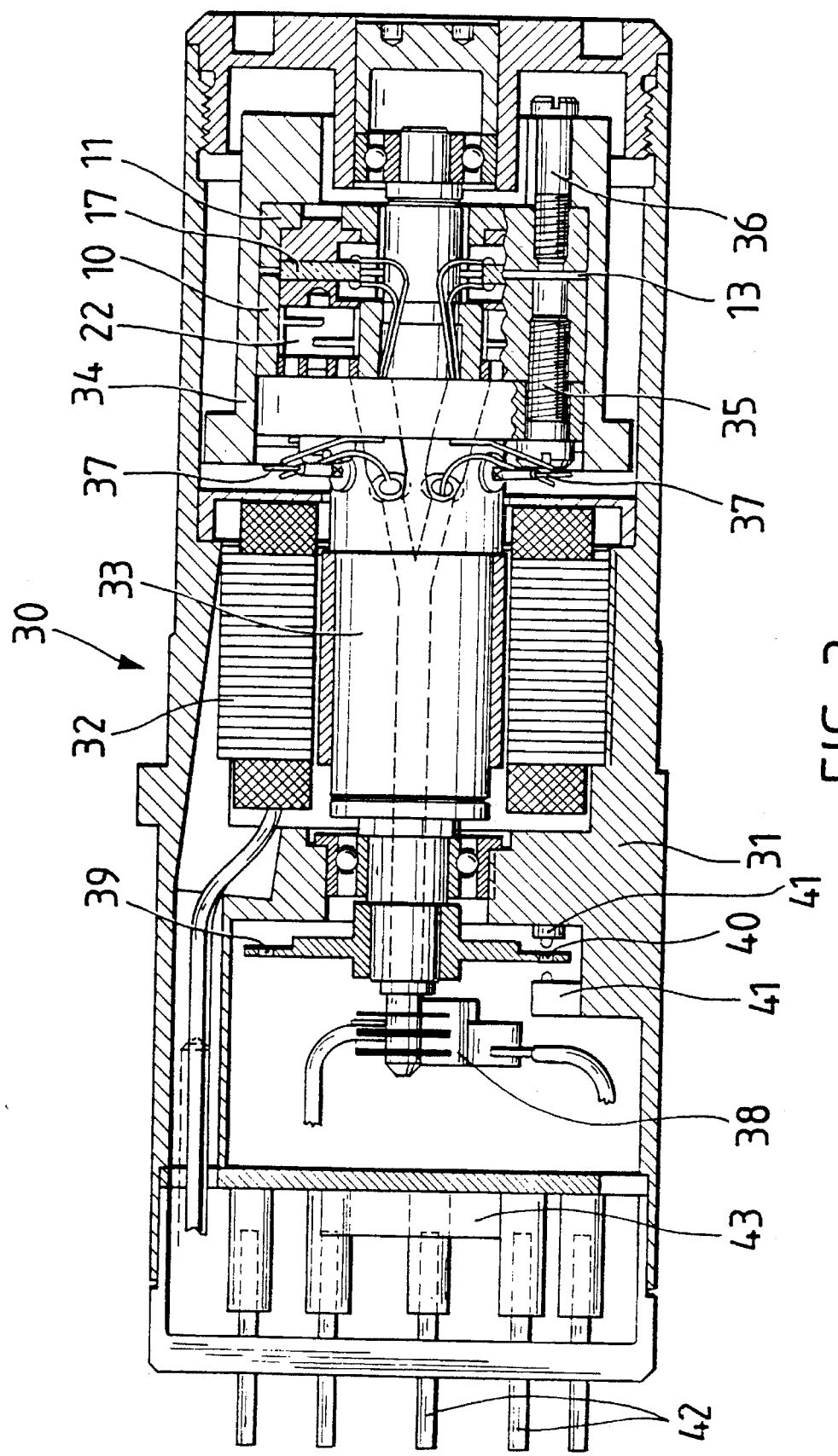
FIG. 3 is a sectional view of a two-axis rate gyro with elastic articulation elements constructed according to preferred embodiments of the invention.

FIG. 3 shows a section through a two-axis rate gyro 30 in which articulation elements 10 and 11 have been installed. Compression springs 22 have been inserted in articulation element 10. Rate gyro 30 consists essentially of a synchronous motor 32 built into a housing 31, a drive shaft 33, and a gyro rotor 34. Articulation element 10 is connected by screws 35, one of which is shown, with drive shaft 33 and articulation element 11 is connected by screws 36 with gyro rotor 34. Other important parts of the rate gyro 30 are: solder spots 37 for connecting the electrical leads from quartzes 17 to a slip-ring transfer device 38, a pulse disk 39 with a slit 40 for a light barrier 41 to generate an angle reference signal, a signal preamplifier 43, and contact pins 42 leading to the outside for an electrical interface.

The function of rotating rate gyro 30 is as follows: The precession moments that appear sinusoidally during measurement operation of the gyro at the rotational frequency of drive shaft 33 produce an alternating pressure load on quartzes 17. The latter generate electrical signals proportional to the pressure loads or the precession moments and hence to the measurement value of the rate gyro input rotation rate. Quartzes 17 are strained against the articulation spring formed by rib 12 by screwing articulation element 10 onto drive shaft 33 by means of springs 21 or 22, locating them in a defined working area. Rib 12 is strained and forms a spring joint with very high rigidity. A DC voltage signal is generated in evaluation electronics located downstream and determines the allocation of the two measurement axes. For this purpose, the angle reference pulse is generated by means of pulse tap 41 between drive shaft 33 and housing 31.

Figure 4:
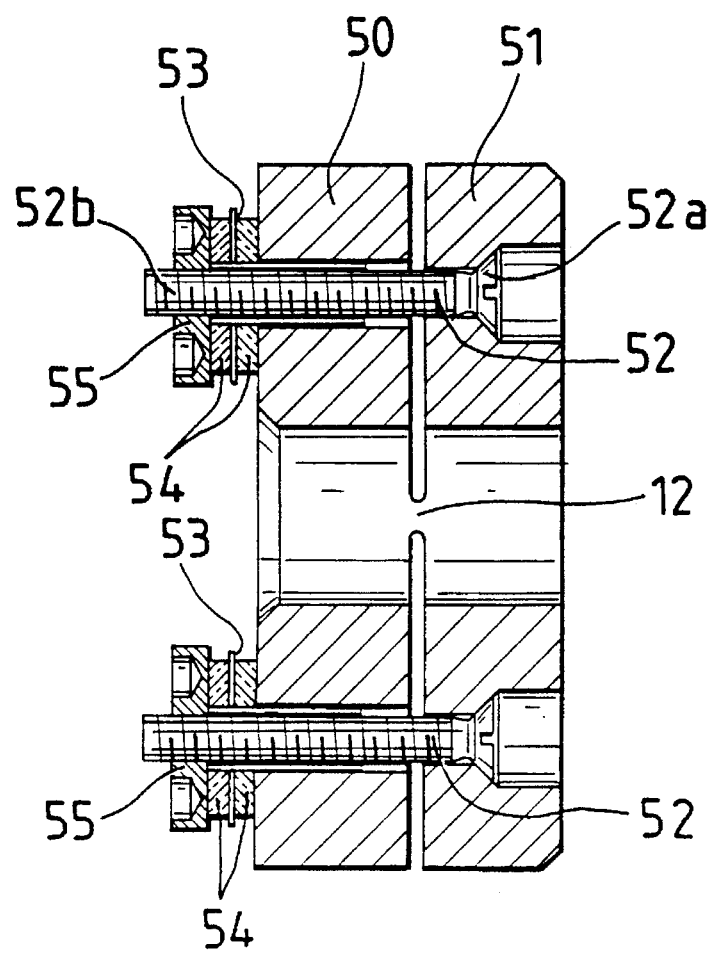
FIG. 4 is a sectional view through elastic articulation elements with another design for the force-measuring elements and the spring elements.

FIG. 4 shows another embodiment of the arrangement of both the force-measuring elements and the spring elements.

Articulation elements 50 and 51, as in the design in FIGS. 1 and 2, have a common rib 12 so that they likewise constitute a spring joint with high rigidity. The spring elements are made as expansion screws 52 with their heads 52a inserted in second articulation element 51 and their shafts 52b passed through first articulation element 50. Two piezoceramics 54 separated by a contact sheet 53 are provided as force-measuring elements. Piezoceramics 54 are pressed against articulation element 50 by nuts 55 mounted on expansion bolts 52, and expansion bolts 52 are pretensioned in a specific manner. Thus piezoceramics 54 are tensioned by means of expansion bolts 52 against the articulation spring formed by the two articulation elements 50 and 51. Rib 52 is then subjected to compressive stress. However, this makes no difference to the tensile stress in the application as far as the quality of the measuring device is concerned. Expansion bolts 52 act under stress through the precession moments in an interaction corresponding to the forces that appear alternately, with one being stressed and the other relaxed alternately.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Two-axis rate gyro comprising:

a drive shaft rotatable about a central axis, a gyro rotor rotatable about the central axis, a first articulation element connected with the drive shaft to rotate together with the drive shaft, a second articulation element connected with the gyro rotor to rotate together with the rotor, a pair of aligned narrow ribs extending radially of said central axis at opposite lateral sides of said central axis and connecting said first and second articulation elements together, and spring elements acting on pretensioned force-measuring elements and being tensioned with respect to one another, the spring elements deforming elastically and symmetrically around the ribs under the influence of a sinusoidally alternating torque during operation of the gyro through which the force-measuring elements are loaded and unloaded alternately and generate measurement signals proportional to forces acting on the force-measuring elements.

2. Rate gyro according to claim 1, wherein each of the first and second articulation elements include a pair of bores extending parallel to said central axis at respective opposite diametric sides of said aligned narrow ribs, said bores of said first articulation element being axially aligned with respective corresponding bores of said second articulation element, wherein said spring elements are arranged in said bores of said first articulation element, and wherein respective ones of said force measuring elements are arranged axially in line with respective ones of said spring elements at a location intermediate the articulation elements adjacent a slit provided between the articulation elements.

3. Rate gyro according to claim 2, wherein the articulation elements are cylindrical in shape, and wherein the spring elements include two diametrically disposed spring elements supported at one of the articulation elements.

4. Rate gyro according to claim 1, comprising a pulse disk, provided with a light barrier for generating an angle reference signal for evaluation electronics.

5. Rate gyro according to claim 1, wherein the articulation elements are cylindrical in shape, and wherein the spring elements include two diametrically disposed spring elements supported at one of the articulation elements.

6. Rate gyro according to claim 5, wherein the force measuring elements include two diametrically disposed force measuring elements aligned with the respective spring elements.

7. Rate gyro according to claim 1, wherein the spring elements are cup springs.

8. Rate gyro according to claim 1, wherein the spring elements are special compression springs.

9. Rate gyro according to claim 1, wherein the spring elements are expansion bolts.

10. Rate gyro according to claim 1, wherein the force-measuring elements are quartzes.

11. Rate gyro according to claim 1, wherein the force-measuring elements are piezoceramic elements.

12. Rate gyro according to claim 5, wherein each of the two spring elements are cup springs.

13. Rate gyro according to claim 5, wherein each of the two spring elements consist of special compression springs.

14. Rate gyro according to claim 5, wherein each of the spring elements are expansion bolts.

15. Rate gyro according to claim 5, wherein the force-measuring elements are quartzes.

16. Rate gyro according to claim 5, wherein the force-measuring elements are piezoceramic elements.

17. Rate gyro according to claim 1, wherein the spring elements include expansion bolts having respective heads resting in the second articulation element and respective shafts passing through the first articulation element, and wherein the force-measuring elements are mounted externally on the shafts and abut the first articulation element by nuts with pretensioning.

18. Rate gyro according to claim 5, wherein each of the spring elements include expansion bolts having respective heads resting in the second articulation element and respective shafts passing through the first articulation element, and wherein the force-measuring elements are each mounted externally on respective ones of the shafts and abut the first articulation element by respective nuts with pretensioning.

19. Rate gyro according to claim 17, wherein each of said force-measuring elements are electrically connected by a contact sheet and wired in parallel with another of said force measuring elements, and are placed on a respective one of the expansion bolts with the contact sheet being connected by leads with a slip-ring transfer device.

20. Rate gyro according to claim 18, wherein the force measuring elements include two diametrically disposed force measuring elements aligned with the respective spring elements and wherein the two force-measuring elements are each electrically connected by a contact sheet and wired in parallel, and are placed on respective ones of the expansion bolts with the contact sheet being connected by leads with a slip-ring transfer device.

21. Rate gyro according to claim 1, wherein solder spots are provided externally on the force-measuring elements, leads from the solder spots connecting the force-measuring elements with a slip-ring transfer device.

22. Rate gyro according to claim 2, wherein solder spots are provided externally on the force-measuring elements, leads from the solder spots connecting the force-measuring elements with a slip-ring transfer device.

* * * * *